Patented June 26, 1945

2,379,372

UNITED STATES PATENT OFFICE 2,379,372

SPLITTING-OFF OF HYDROGEN HALIDE FROM HALOGENATED HYDROCARBONS

Martin Mugdan, Richmond, and Derek Harold Richard Barton, London S. W. 7, England, assignors to The Distillers Company Limited, Edinburgh, Scotland, a British company No Drawing. Application December 31, 1942, Serial No. 470,850. In Great Britain August 21, 1941

5 Claims. (Cl. 260—654)

This invention is for improvements in or relating to the splitting-off of hydrogen chloride from chlorinated hydrocarbons.

In the splitting-off of hydrogen chloride from chlorinated hydrocarbons many catalysts, particularly metal chlorides, have been proposed and are in fact in use, the vapour of the compound being passed over the catalyst at an elevated temperature. For large scale commercial use these processes present the same disadvantages as other heterogeneous catalytic reactions, principally the low heat conductivity of the catalyst and its restricted useful life.

We have found that the dissociation of many aliphatic chlorinated hydrocarbons can be effected in an unexpectedly simple and easy way and according to the invention there is provided a process for splitting-off hydrogen chloride from an aliphatic chlorinated hydrocarbon containing 2 carbon atoms in the molecule and containing the group —CHCl—CHCl— which comprises heating the said hydrocarbon vapour with a small amount of oxygen. In some cases the reaction temperature is reduced by more than a hundred degrees centigrade by the addition of oxygen or air as compared with thermal decomposition processes in which no oxygen is used. The process does not appear to be a true catalysis, for the oxygen, or part of it, also appears to take part in the reaction. It is possible that the oxygen acts by starting chain reactions.

The following examples illustrate the invention:

*Example I.*—Ethylene dichloride was dropped in a uniform stream of 38 gr. per hour into the upper end of a tube of a heat-resistant glass of 11 mm. diameter, 800 mm. length, somewhat inclined and heated over a length of 600 mm. to the temperatures indicated below. Simultaneously 200 ccm. oxygen (1000 ccm. air gave quite a similar effect) were passed through the tube. The excess ethylene chloride was condensed out of the issuing gases, which were then washed with water to remove hydrogen chloride, dried with calcium chloride and the vinyl chloride was then condensed at low temperature. The excess ethylene dichloride was kept at a gentle reflux to prevent solution of the vinyl chloride. At 300° C. 30% and at 350° C. 60% by weight were converted into vinyl chloride; no by-products were found apart from a little acetylene. When the oxygen was substituted by nitrogen the conversion at 400° C. was only 2% and even at 500° C. not more than 30% by weight.

*Example II.*—Symmetrical tetrachloroethane, 30 gr. per hour, was passed through a similar tube to that used in Example I together with 200 ccm. oxygen. The products obtained were introduced into cooled water and condensed therein. At 300° C. 3% by weight was transformed into trichloroethylene, at 350° C. 80% and at 400° C. 93% by weight yield was obtained. No by-products were produced. Without oxygen the conversion was nil at 300° C., at 350° C. 1% and at 400° C. 65% by weight.

*Example III.*—1,1,2 trichloroethane was heated with oxygen in the same way as described in Example 1. With an input of 31 gr. per hour the conversion rates were: at 350° C. 23% and at 400° C. 89% by weight, without oxygen the conversion was at 350° C. 1.5% and at 400° C. 4% by weight. The product was a mixture of the asymmetrical and the symmetrical dichloroethylene in which the asymmetric compound predominated. No other products were formed.

The velocity of reaction is much influenced by small quantities of impurities, as is known to occur in other chain reactions; the yield obtained from different batches of raw materials may therefore vary somewhat under identical reaction conditions. However, in every case, the addition of oxygen or an oxidising compound had a beneficial effect. Alcohols, ethylene oxide and some hydrocarbons have proved especially harmful in this process but acetic acid, on the other hand, has been found to have little or no adverse effect on the reaction. It may, therefore, be necessary to purify the materials used in order to attain the best results. In the experiments, described in the examples, the starting materials were carefully freed from impurities by fractionation, and in some cases also by a pretreatment with sulphuric acid, or with alkali or with both in succession, followed by washing with water. However, the commercially obtainable products are not useless for carryig out the process. The pure ethylene chloride used in Example I was obtained by purifying a commercial product made from alcohol via ethylene. The crude product, mixed with 1% by weight of oxygen, gave, at 500° C., 64% by weight conversion, whilst without oxygen, and in a stream of nitrogen, 4% by weight only was obtained. The effect of the oxygen is evident, but the purified material reacts more rapidly at a temperature which is lower by 150° C. Similarly with symmetrical tetrachloroethane the commercial material gives a 57% by weight conversion at 350° C. with oxygen, without it only about 3%.

Packing the reaction tube decreased the reaction velocity considerably in all cases, as is the case in other chain reactions.

As materials for the reaction chamber alloys rich in nickel have proved especially useful. By reason of the low reaction temperature of some chlorinated hydrocarbons in this process alloys rich in iron can be used.

What we claim is:

1. A process for the splitting-off of hydrogen chloride from a chlorinated hydrocarbon which contains 2 carbon atoms in the molecule and also contains the grouping —CHCl—CHCl—, which comprises heating the chlorinated hydrocarbon in the vapor state and in admixture with an amount of oxygen of about ½ to 1% by weight of the chlorinated hydrocarbon to an elevated temperature of the order of 300–500° C.

2. A process according to claim 1 wherein the chlorinated hydrocarbon is purified prior to the reaction.

3. A process according to claim 1 wherein the chlorinated hydrocarbon is ethylene dichloride and the resultant product is vinyl chloride.

4. A process according to claim 1 wherein the chlorinated hydrocarbon is symmetrical tetrachloroethane and the resultant product is trichloroethylene.

5. A process according to claim 1 wherein the chlorinated hydrocarbon is 1,1,2-trichloroethane and the resultant product is a mixture of asymmetrical and symmetrical dichloroethylenes.

MARTIN MUGDAN.
DEREK HAROLD RICHARD BARTON.